Patented July 24, 1923.

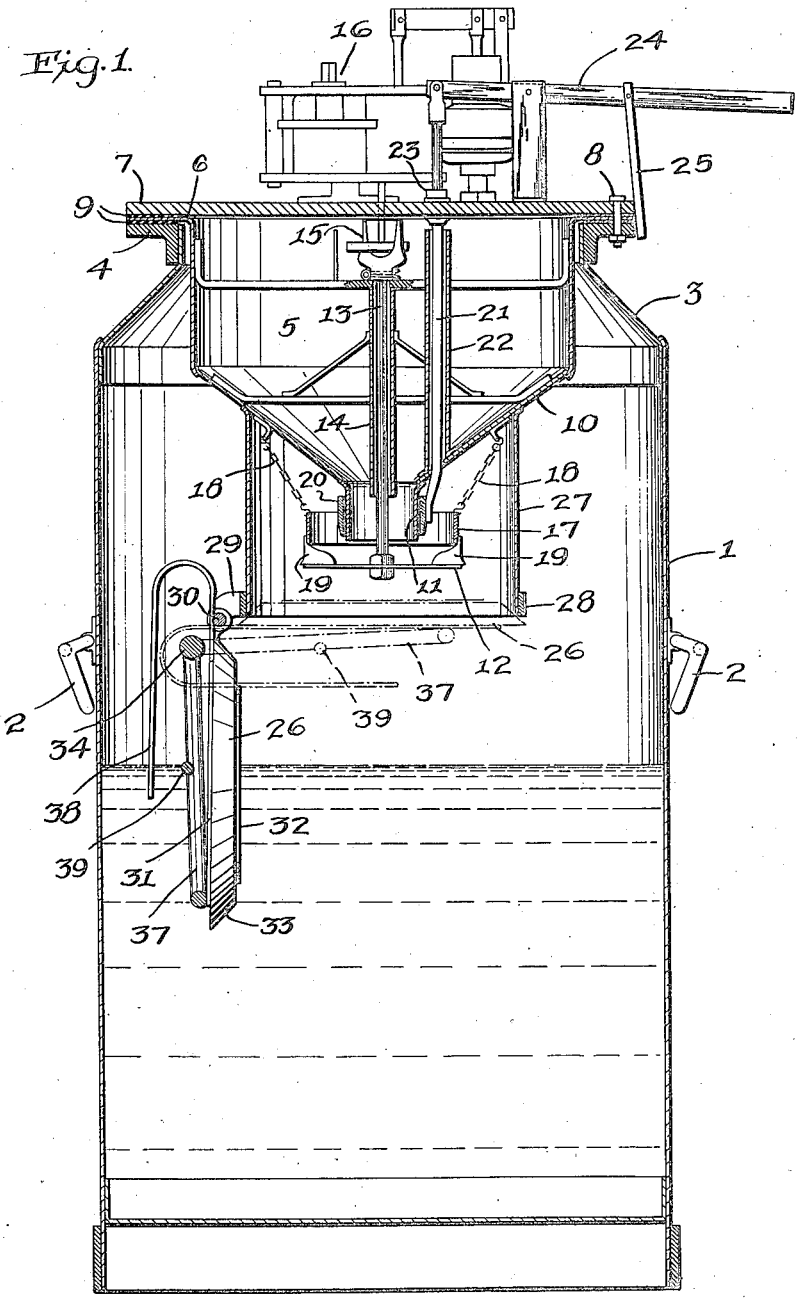

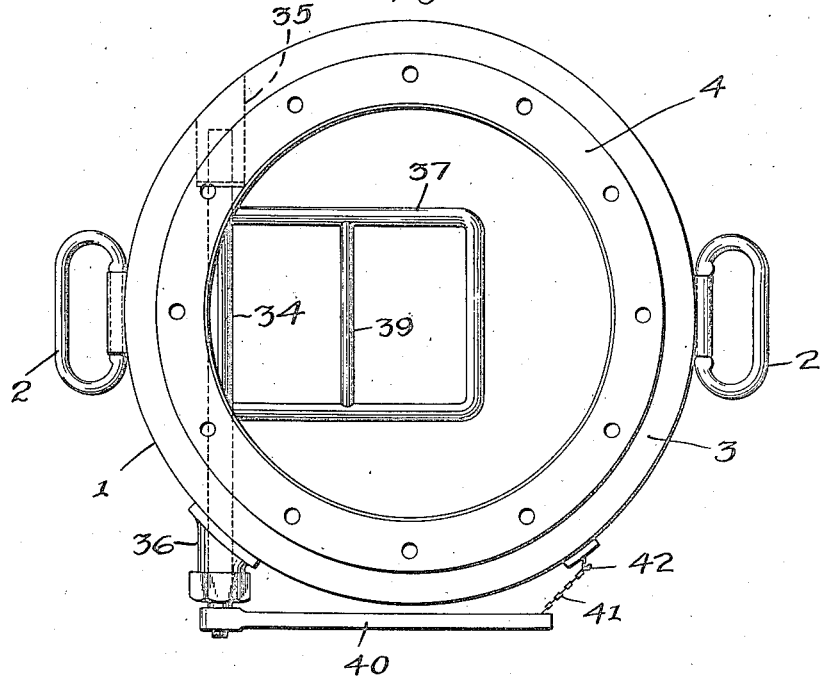
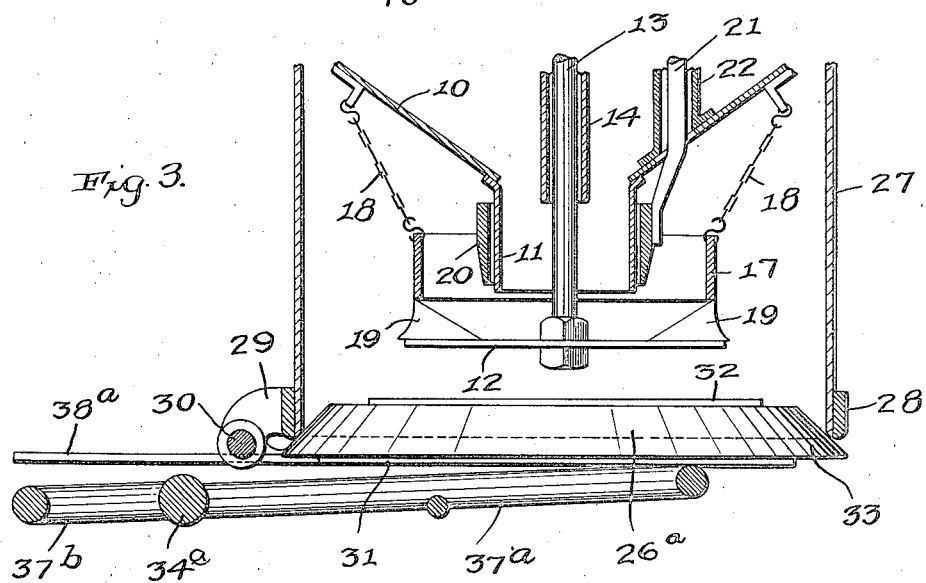

1,462,623

UNITED STATES PATENT OFFICE.

STUART PLUMLEY, OF WESTFIELD, NEW JERSEY, ASSIGNOR, BY MESNE ASSIGNMENTS, TO AIR REDUCTION COMPANY, INCORPORATED, OF NEW YORK, N. Y., A CORPORATION OF NEW YORK.

PORTABLE ACETYLENE GENERATOR.

Application filed February 11, 1919. Serial No. 276,372.

*To all whom it may concern:*

Be it known that I, STUART PLUMLEY, a citizen of the United States, and resident of Westfield, in the county of Union and State of New Jersey, have invented a new and useful Portable Acetylene Generator, of which the following is a specification.

The invention relates to acetylene generators, and the object is to provide a portable generator of the carbide-to-water type wherein the carbide can be effectively closed off from all access by the water when the generator is to be moved.

In the accompanying drawings forming a part hereof:

Fig. 1 is a vertical section through a generator embodying the invention, with interior parts in elevation;

Fig. 2 is a plan view of the generator body with the top plate 7 and carbide hopper 5 and parts carried thereby removed; and Fig. 3 is an enlarged vertical sectional elevation illustrating a modification.

The body of the generator comprises an upright cylindrical tank 1, having handles 2, and terminating in a frusto-conical top-ring 3, bearing an angled attachment flange 4. A carbide hopper 5 is set into the top of the tank, where it is supported by its flanged-out upper end 6 resting on the flange 4. A top plate 7 covers the hopper, and is bolted through by bolts 8 to the flange 4, gaskets 9 being interposed between the hopper flange, attachment flange, and plate, to render the joint gas-tight.

The hopper has a frusto-conical bottom 10 with a central exit defined by a downward projecting neck 11. A horizontal rotary feeding disk or platform 12 is disposed in spaced relation below the neck 11, upon the lower end of a rotary shaft 13 passing through a fixed tube 14 in the center of the hopper. The shaft and disk are rotated through a clutch 15 by a suitable motor 16 on the top plate. A narrow displacer ring 17 is hung from the hopper by chains 18, the ring encircling the carbide exit at a distance, and bearing displacer plows 19, which stand immediately above the outer part of the feeding disk. The rotation of the disk or platform below the plows gradually pushes the lumps of carbide over the edge, to fall into the water in the tank below. This illustrative carbide feed is of known character, and does not require to be more particularly described. It will be understood that customary means are provided for automatically stopping and starting the feed in accordance with the generation or the pressure in the tank. The carbide is introduced into the hopper through a usual filling-plug (not shown) in the top plate.

When the generator is not in action a collar 20 telescoping the neck 11 can be pressed down upon the disk 12, substantially closing the carbide outlet. The collar is operated by a rod 21 passing through a tube 22 in the hopper and a stuffing-box 23 in the top plate, and connected with a hand lever 24 above the plate. This lever has a pivoted strut 25 adapted to bear upon the top plate to hold the collar closed, and the weight of the parts is such as normally to keep it open. This provision is useful, and in the present instance prevents carbide working out of the hopper and piling up on the valve 26, presently to be described, when the said valve is closed; but it does not in itself constitute a closure sufficiently tight to insure against moisture reaching the carbide when the loaded generator is moved about and the body of water agitated in consequence.

For complete protection the said valve 26 is installed. An imperforate ring 27 is united at its upper end to the sloping bottom of the hopper, the same being of sufficient depth and diameter to enclose the feeding region and the parts co-operative with the exit, except at the bottom. The ring is therefore of large diameter as compared with the exit from the hopper. A frame annulus 28 united to the lower end of said ring bears lugs 29 at one side, to which the valve 26 is hinged at 30. The valve is desirably formed of back and front plates 31, 32, suitably connected and holding a heavy rubber gasket 33, having a beveled edge to seat tightly against the annulus 28, or the lower end of the ring 27.

An operating rock-shaft 34 extends horizontally across the interior of the tank, toward one side, behind and below the hinge-axis of the valve. One end of said shaft is journaled in a bearing 35 on the inside of the tank wall, and its remote portion passes through the wall and an external stuffing-box bearing 36. The intermediate portion of the shaft bears a frame or bail-arm 37, which is adapted to bear upon the back of the valve, to close the same, the frame extending to a point on the valve remote from the hinge for effective action. A tail 38 on the valve, returned upon the opposite side of the frame, enables the latter also positively to open the valve, by the pressure of a cross-piece 39 of the frame on the tail.

A lever handle 40 is secured to the projecting end of the shaft 34 for manual operation. A chain 41 attached to the handle and co-operative with a hook 42 on the tank affords means for holding the valve tightly closed, the spring of the parts enabling a link of the chain to be strained on over the hook so as to maintain the closing means under elastic tension, with the valve firmly seated.

Normally the valve 26, frame 37 and handle 40 hang vertically under the action of gravity, the valve being wide open and offering no obstruction to the feeding of the carbide and the regular functioning of the generator. When the machine is to be transported, the collar 20 is locked down on the feeding disk 12, and the lever 40 is swung up and hooked. The latter operation, through the frame 37, forces the valve upward, closing the mouth of the ring 27 in a water-tight manner. When the generator is again to be placed in use, the collar 20 is lifted, and the handle 40 is unhooked. If the valve should then fail to drop to open position, downward pressure upon the lever will promptly release it.

Fig. 3 shows a similar construction, except that the tail 38ª of the valve 26ª is straight, and the frame 37ª is provided with an extension 37ᵇ at the opposite side of the shaft 34ª to co-operate with the straight tail, so as to knock the valve open in case of sticking. This form is more suitable for larger generators than the one shown in the other views. In both cases, it will be observed, the valve and valve ring form part of the inserted hopper unit carried by the top plate, while the valve operating means is mounted in the body of the generator.

What I claim as new is:

1. In a portable acetylene generator, and in combination with a tank casing, a carbide hopper terminating in a downwardly directed exit, and feed means cooperating with said exit; a ring of large diameter compared with said exit joined with the hopper and surrounding the lower part of the hopper, said exit and feed means, a hinged valve for closing the lower end of said ring and thereby completely enclosing the hopper exit and feed means, and an operating device for said valve separate from the valve and mounted in the body of the tank casing.

2. In a portable acetylene generator, the combination with a tank and a hopper with feed means inserted therein, of a ring joined with the hopper and surrounding the outlet, a hinged valve mounted with the ring for closing the lower end thereof when desired, and operating means mounted separately from the valve in the body of the tank and adapted to actuate the valve positively for both opening and closing.

3. In a portable acetylene generator, the combination with a tank and a hopper with feed means inserted therein, of a ring joined with the hopper and surrounding the outlet, a hinged valve mounted with the ring for closing the lower end thereof when desired, a tail extending from the valve, and an operating frame mounted in the body of the tank co-operative with the back of the valve to close it, and with the tail for opening.

STUART PLUMLEY.